(12) United States Patent
Profit

(10) Patent No.: US 7,634,841 B2
(45) Date of Patent: *Dec. 22, 2009

(54) LOAD BINDER

(76) Inventor: Grant Profit, Box 1873, Cochrane, Alberta (CA) T4C 1B7

( * ) Notice: Subject to any disclaimer, the term of this patent is extended or adjusted under 35 U.S.C. 154(b) by 570 days.

This patent is subject to a terminal disclaimer.

(21) Appl. No.: 11/426,321

(22) Filed: Jun. 26, 2006

(65) Prior Publication Data

US 2006/0263162 A1 Nov. 23, 2006

Related U.S. Application Data

(63) Continuation of application No. 10/888,937, filed on Jul. 12, 2004, now Pat. No. 7,065,840.

(51) Int. Cl.
    B25B 25/00 (2006.01)
(52) U.S. Cl. .................................. 24/71 TD; 24/68 CD
(58) Field of Classification Search ........... 24/270–273, 24/19, 68 R, 68 CD, 69 R, 70 R, 70 CT, 70 ST, 24/69 ST; 254/243
    See application file for complete search history.

(56) References Cited

U.S. PATENT DOCUMENTS

| 2,089,679 A |   | 8/1937 | Williams |        |
|---|---|---|---|---|
| 2,564,821 A | * | 8/1951 | Smith ........................... | 24/273 |
| 2,824,717 A |   | 2/1958 | Yeager |        |
| 2,947,514 A | * | 8/1960 | Goss ........................... | 24/270 |
| 3,591,141 A |   | 7/1971 | Ratcliff |        |
| 3,826,469 A |   | 7/1974 | Ratcliff et al. |        |
| 3,954,252 A | * | 5/1976 | Lyons ........................... | 24/270 |
| 4,122,560 A |   | 10/1978 | Baker |        |
| 4,280,432 A |   | 7/1981 | Dessel |        |
| 4,422,218 A |   | 12/1983 | Brasseux |        |
| 4,423,639 A |   | 1/1984 | Grade et al. |        |
| 4,500,073 A |   | 2/1985 | Smith |        |
| D309,854 S |   | 8/1990 | Smith |        |
| 4,977,646 A |   | 12/1990 | McCraw |        |
| 5,002,002 A | * | 3/1991 | Awalt, Jr. ..................... | 114/210 |
| 5,070,582 A |   | 12/1991 | Anderson |        |
| 5,429,462 A |   | 7/1995 | Anderson |        |
| 5,570,897 A |   | 11/1996 | Wass |        |
| 5,692,269 A |   | 12/1997 | Kamper |        |
| 5,807,047 A |   | 9/1998 | Cox |        |
| 6,105,469 A |   | 8/2000 | Gracy |        |
| 6,477,747 B1 | * | 11/2002 | Flagg ........................ | 24/68 CD |
| 7,065,840 B2 | * | 6/2006 | Profit ........................ | 24/71 TD |
| 7,249,907 B2 | * | 7/2007 | Kay ............................ | 403/48 |
| 2004/0064921 A1 | * | 4/2004 | Mittleider ................. | 24/68 CT |

* cited by examiner

*Primary Examiner*—James R Brittain
(74) *Attorney, Agent, or Firm*—George A. Seaby

(57) ABSTRACT

A load binder for use in connection with a typical tie strap for securing a load for transport is provided. The load binder includes elements that are conformable to the shape of a particular load and which prevent the tie down from twisting upon itself. The load binder essentially comprises a body having and a handle pivotally attached to the body, a link pivotally attached to the handle, a first tie down engaging element attached to the link by a ball joint and a second tie down engaging element attached to the threaded shaft by a ball joint. The freely movable ball joints coupling the tie engaging elements to the binder allow the binder to conform to the shape of the load and also prevent the tie down from twisting upon itself. Additionally, a safety latch is incorporated into the binder which positively locks the handle in position relative to the body.

18 Claims, 2 Drawing Sheets

LOAD BINDER

CROSS-REFERENCE TO RELATED APPLICATIONS

This application claims the benefit of U.S. application Ser. No. 10/888,937, filed Jul. 12, 2004, the entire of which is incorporated herein by reference.

BACKGROUND OF THE INVENTION

Field of the Invention

The present invention relates generally to load binders for tensioning tie downs used to secure a load of cargo for transportation. More particularly, relating to a load binder having elements that are conformable to the shape of a particular load and which includes an improved tension adjustment assembly and safety lock.

SUMMARY OF THE INVENTION

In accordance with the present invention, an improved load binder is provided for tensioning a tie down and which is conformable to the shape of the load being secured by the tie down and which also reduces twisting of the tie down.

One of the main improvements of the load binder of the present invention is found in the use of flexible joints for attaching tie down engaging elements to the load binder so that the load binder is able to conform to the general cross sectional shape of the load being secured by the tie downs.

Heretofore, load binders have been rigid machines that did not include elements allowing the load binder to generally conform to the shape of the cargo being secured by the tie down without putting undue bending strain and stress on the load binder. Load binders are designed to take large axial loading which is required to provide a large amount of tension in the tie downs to properly secure a load being transported. However, load binders quite frequently experience large bending moments created by tensioning a tie down around a curvilinear load, such as large diameter pipes quite frequently used in drainage systems, large stacks of smaller diameter pipes, stacks of timber and the like. There is a high frequency of failure in prior art load binders when used in securing loads of this type, which results in injury to operators or pedestrians and damage to the load.

As such, the load binder of the present invention is conformable to the cross sectional shape of the load being secured to prevent failure of the load binder due bending stress, thereby increasing the safety of the operator, safety of pedestrians and safety of the load being transported.

In doing so, the load binder essentially comprises a body having a bifurcated first end and an elongated second end that defines an axial bore which includes a threaded portion, a handle having a bifurcated first end which is received by the bifurcated end of the body and which is pivotally attached therewith by a pair of pins, one each coupling the juxtaposed furcations of the bifurcated first end of the body and the bifurcated first end of the handle, a threaded shaft threadably received by the second end of the body, a link pivotally attached to the first end of the handle, a first tie down engaging element attached to the link by a ball joint, a second tie down engaging element attached to the threaded shaft by a ball joint and a safety pin.

An additional advantage of the instant load binder is the ability of the load binder to reduce twisting of the a tie down during the tensioning thereof, which will be described in further detail infra.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DETAILED DESCRIPTION OF THE INVENTION

Figure 1:
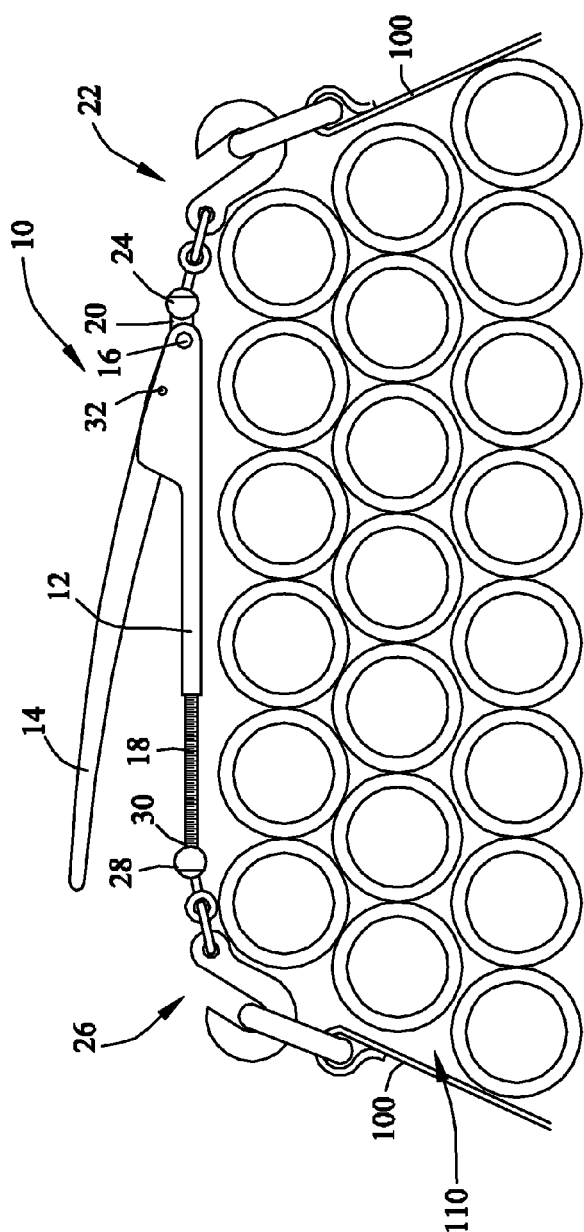
FIG. 1 is a side elevation view of the preferred embodiment of the load binder in use securing a tie down about a stack of pipes.

Referring now to the drawings, and particularly to FIGS. 1-5 a preferred embodiment of the load binder of the present invention is shown and generally designated by the reference numeral 10.

In FIG. 1, a new and improved load binder 10 of the present invention for tensioning a typical tie down 100 to secure a typical load 110 is illustrated and will be described. More particularly, the load binder 10 is comprised of a body 12, a handle 14 pivotally connected to the body at point 16, a threaded shaft 18, a link 20, which is pivotally connected to the handle 14, a first tie down engaging element 22 connect to the link by a ball joint 24, a second tie down engaging element 26 connected to the threaded shaft by a ball joint 28 at point 30 and a safety pin 56.

The load binder 10 is illustrated in an in-use configuration where the handle 10 is closed against the body 12 to remove slack in the tie down 100 to secure the load 110. For exemplary purposes only, the load 110 is illustrated as a stack of small diameter pipes having a curvilinear cross sectional shape. The view illustrates how the load binder can conform to the shape of the load, where each ball joint 16 and 28 are slightly rotated downward towards the load so that the tie engaging elements 22 and 26 can partially wrap around the load to engage the ends of the tie down 100, while transferring the majority of tension force present within the tie down axially along the load binder to reduce bending stress thereof.

Prior art load binders do not have the provision of the ball joint coupling elements 16 and 28 for attaching tie engaging elements 22 and 26 to the load binder 10. While most prior art load binders make use of a typical chain link or D-ring connection between the tie engaging elements and the load binder allowing the tie engaging element to pivot in a single plane in space to slightly conform to a load, this arrange creates a sharp angle change along the tension force path which results in a high bending moment in the load binder.

In addition, the methods of attaching the tie engagement elements of prior art load binders with the binder does not allow for the tie engagement elements to rotate freely about an axis parallel to the tie engaging elements. This quite frequently results in a tie down twisting upon its self as tension is applied by during the actuation of the load binder. This creates a major point of failure with the integrity of the securment of the load, in that during transport the load may shift resulting in the tie becoming untwisted causing the tie to lose tension and to not properly secure load, which can result in the load becoming free during transportation. The inclusion of the ball joints 16 and 28 in the preferred embodiment for attaching the tie engaging elements 22 and 26 to the load binder 10 insures the tie will not twist upon itself during tensioning thereof.

Figure 2:
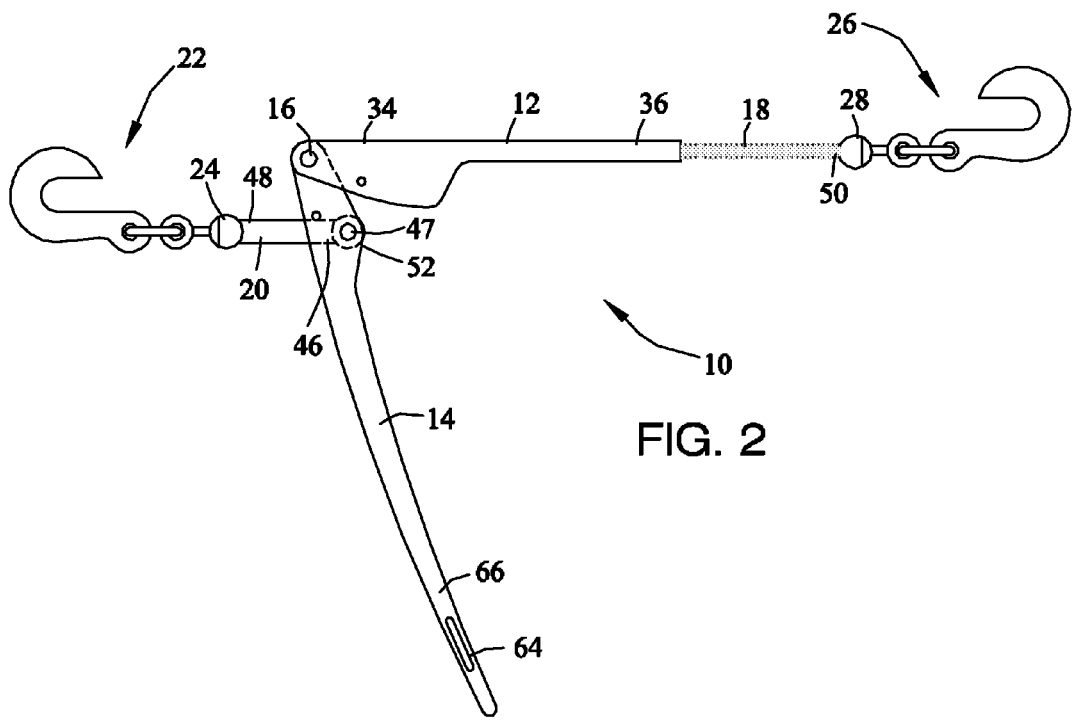
FIG. 2 is a side elevation view of the load binder illustrating the binder in a generally non-clamped position.
Figure 3:
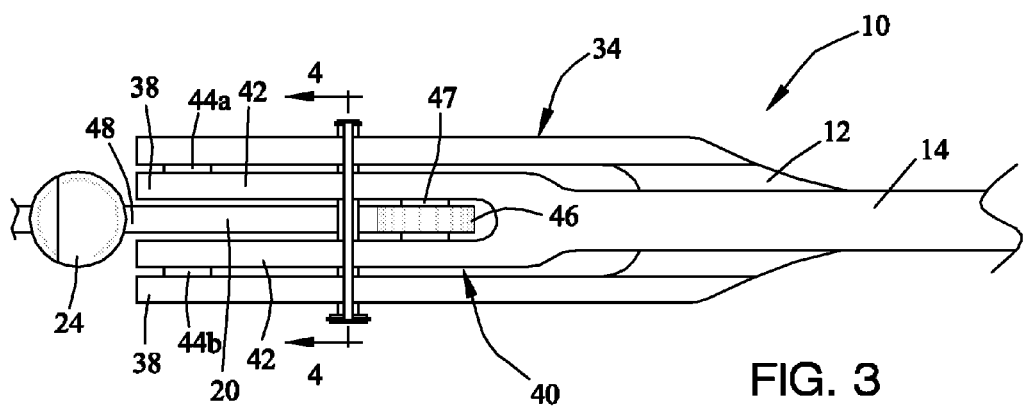
FIG. 3 is an enlarged partial top plan view of the load binder in a clamped, loaded position.

Now turning to FIGS. 2 and 3, in FIG. 2 the load binder 10 is illustrated in a non-clamped position with the handle 14 rotated away from the body 12 and in FIG. 3, which is an enlarged detailed top view, the load binder shown in a generally closed position. The body 12 includes a bifurcated first end 34 having two parallel furcations 38 and an elongated second end 36, which is adapted to threadably receive the threaded shaft 18.

The handle 14 has a bifurcated first end 40 having two parallel furcations 42 which are positioned between the furcations 38 of the first end 34 of the body 12, as illustrated. Each pair of juxtaposed furcations 38 and 42 are pinned to each other by a pair pins 44a and 44b. The use of two separate pins 44a and 44b allows the space between the furcations 42 to remain open so as to receive the link 20 therebetween.

A first end 46 of the link 20 is pivotally connected to the handle between the furcations 42 by a link pin 47. The free end 48 of the link 20 is free to pivot between the furcations 38 of body 12 and the furcations 42 of the handle 14. Ball joint 24 is connected between the end 48 of the link 20 and the tie engaging element 22, and ball joint 28 is connected between end 50 of the threaded shaft 18 and the tie engaging element 26.

Preferably, the first end 40 of the handle is triangular shaped with the first end 46 of the link 10 fixedly pinned at apex 52 by the link pin 47. The triangular shaped end 40 of the handle 14 with the link 10 pinned at apex 52 provides a cam action between the handle 14 and the body 12 when the handle is rotated where the center line parallel to the tension force along link 10 of the apex passes a corresponding parallel center line of the pinned connections between furcations 38 and 42. Most preferably, the handle 14 is elongated and is of a length that is greater then the length of the body 12 to provide a force advantage to an operator aiding the operation of the load binder 10.

Figure 4:
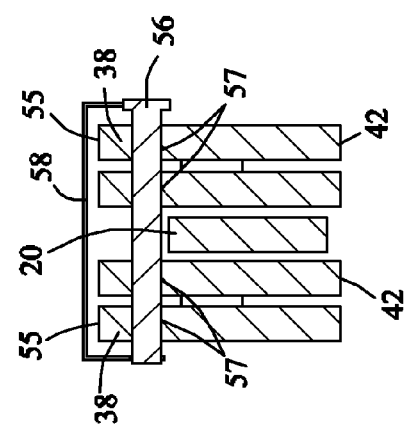
FIG. 4 is a cross sectional view taken along line 4-4 in FIG. 3.

Turning now to FIG. 4, which is an enlarged cross sectional view of the load binder 10 taken along line 4-4 in FIG. 3. The load binder 10 can also include a safety pin 56 that is passed through cooperating holes 57 formed through each furcation 38 of the end 34 and through each furcation 42 of end 40. The safety pin 56 provides an additional security feature to the load binder 10 by locking the relative position of the handle 14 with the body 12 ensuring the handle will not pop lose when loaded and securing a tie down. In this arrangement, the safety pin 56 passes across the handle ensuring the handle will not rotate in a direction outwardly from an outward facing surface 55 of the body. Further in this arrangement, the safety pin 56 passes across the link 20 preventing the link from rotating in a direction outwardly from the outward facing surface 55. The safety pin 56 passes across the link 20 at a position outward from the link. The outward position being between the link 20 and the outward facing surface 55 of the body. Most preferably, a clasp 58 is provided and is fixedly attached to the safety pin 56 at one and removably attached to the safety pin at an opposite end. Most preferably, the clasp 58 is attached to the ends of the safety pin 56 beyond the outer surfaces of the furcations 38 and wraps around the furcations 38 and 42 from one end of the safety pin to the opposite end of the safety pin.

While the preferred safety pin 56 is describe supra it is recognized other elements or different types of pins could reasonable be substituted for the safety pin 56 as preferably described. Examples of different types of elements that could be substituted for safety pin 56 includes but is not limited to a padlock or a D-ring or the like. Examples of different types of pins that could be substituted includes but is not limited to a cotter pin, a roll pin, a clevis pin, a hitch pin or a snap pin.

Figure 5:
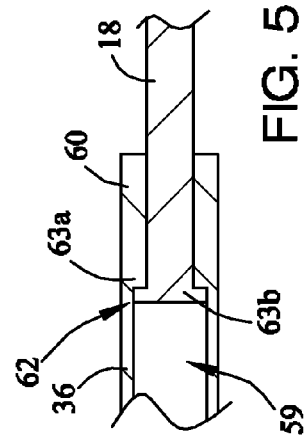
FIG. 5 is a partial cross sectional view of the second end of the body of the load binder.

Referring now to FIG. 5, which a partial longitudinal cross section view of the second end 36 of the body 12 and of the threaded shaft 18. The second end 36 defines an axial bore 59 which includes a threaded section 60 to which the threaded shaft 18 is threaded into. The threaded shaft 18 can be threaded into and out of the axial bore 58 to a predetermined length to adjust the over-all length of the load binder 10. By turning the threaded shaft 18 in or out of the axial bore 59, the length of the load binder 10 can be finely adjusted to provide a desired amount of tension in the tie down. Additionally, a stop means 62 can be incorporated into the end 36 and the threaded shaft 18 to prevent the threaded shaft from being completely removed from the axial bore 59 and to retain a predetermined, desired length of the threaded shaft within the axial bore. An example of stop means 62 includes the threaded shaft 18 having a mushroomed head 63b and the axial bore 59 having a shoulder 63a that the head 63b abuts when the thread shaft is turned out a predetermined distance, thereby preventing the thread shaft from further removal from the axial bore. Preferably, the predetermined length is at least about twice the diameter of the threaded shaft 18. Most preferably, the predetermined length is at least one inch.

In an additional embodiment, a slot 64 can be formed through the end 66 of the handle 14 opposite the bifurcated end 34. The slot 64 is adapted to receive a safety strap (not illustrated) threaded therethrough, which is secured around the second end 36 of the body to prevent the end 66 of the handle 14 from opening away from the second end 36 of the body.

A number of embodiments of the present invention have been described. Nevertheless, it will be understood that various modifications may be made without departing from the spirit and scope of the invention. Accordingly, other embodiments are within the scope of the following claims.

I claim:

1. A load binder for use in connection with a load securing tie down for securing a load for transport, the load binder comprising:
   a body having an outward facing surface and first and second ends, wherein said first end is bifurcated and wherein said second end defines an axial bore;
   a handle having first and second ends, wherein said first end of said handle is bifurcated, said bifurcations of said first end of said handle are pivotally attached to said bifurcations of said first end of said body;
   a link having first and second ends, said link being positioned between said furcations of said handle with said first end thereof pivotally connected to said handle;
   a shaft having first end and second ends, said first end received by said axial bore of said body and said second end extending beyond said second end of said body;
   a first tie engaging element;
   a first ball joint coupling said first tie engaging element to said second end of said link;
   a second tie engaging element;
   a second ball joint coupling said second tie engaging element to said second end of said shaft; and
   a safety pin extending between said furcations of said body such that said pin passes across said link preventing said link from rotating in a direction outward of said outward facing surface of said body.

2. The load binder of claim 1, wherein said safety pin passes across said a link at an outward position of said link.

3. The load binder of claim 2, wherein said outward position is a position between said link and said outward facing surface of said body.

4. The load binder of claim 1, wherein said pin is received by cooperating through holes formed through said furcations of said body.

5. The load binder of claim 4, wherein said safety pin passes across said a link at an outward position of said link.

6. The load binder of claim 5, wherein said outward position is a position between said link and said outward facing surface of said body.

7. The load binder of claim 1, wherein said safety pin crosses said handle, thereby preventing said handle from rotating in a direction outwardly from said body.

8. The load binder of claim 1, wherein said furcations of said handle are received between the furcations of said body.

9. The load binder of claim 8, wherein said safety pin passes across said a link at an outward position of said link.

10. The load binder of claim 9, wherein said outward position is a position between said link and said outward facing surface of said body.

11. The load binder of claim 1, wherein said safety pin crosses said handle.

12. A load binder for use in connection with a load securing tie down for securing a load for transport, the load binder comprising:
    a body having an outward facing surface and first and second ends, wherein said first end is bifurcated and wherein said second end defines an axial bore having a threaded end section;
    a handle having first and second ends, wherein said first end of said handle is bifurcated, said bifurcations of said first end of said handle are pivotally attached to said bifurcations of said first end of said body;
    a link having first and second ends, said link being positioned between said furcations of said handle with said first end thereof pivotally connected to said handle;
    a threaded shaft having first end and second ends, said first end threadably received by said threaded end section of said body and said second end extending beyond said second end of said body;
    a first tie engaging element;
    a first ball joint coupling said first tie engaging element to said second end of said link;
    a second tie engaging element;
    a second ball joint coupling said second tie engaging element to said second end of said threaded shaft; and
    a safety pin extending between said furcations of said body such that said pin passes across said link and said handle preventing said link and said handle from rotating in a direction outward of said outward facing surface of said body.

13. The load binder of claim 12, wherein said safety pin passes across said a link at an outward position of said link.

14. The load binder of claim 13, wherein said outward position is a position between said link and said outward facing surface of said body.

15. The load binder of claim 12, wherein said furcations of said handle are received between the furcations of said body.

16. The load binder of claim 15, wherein said safety pin passes across said a link at an outward position of said link.

17. The load binder of claim 16, wherein said outward position is a position between said link and said outward facing surface of said body.

18. The load binder of claim 12, wherein said safety pin is received by said furcations of said body through cooperating throughholes formed through each furcation.

* * * * *